United States Patent Office 2,934,124
Patented Apr. 26, 1960

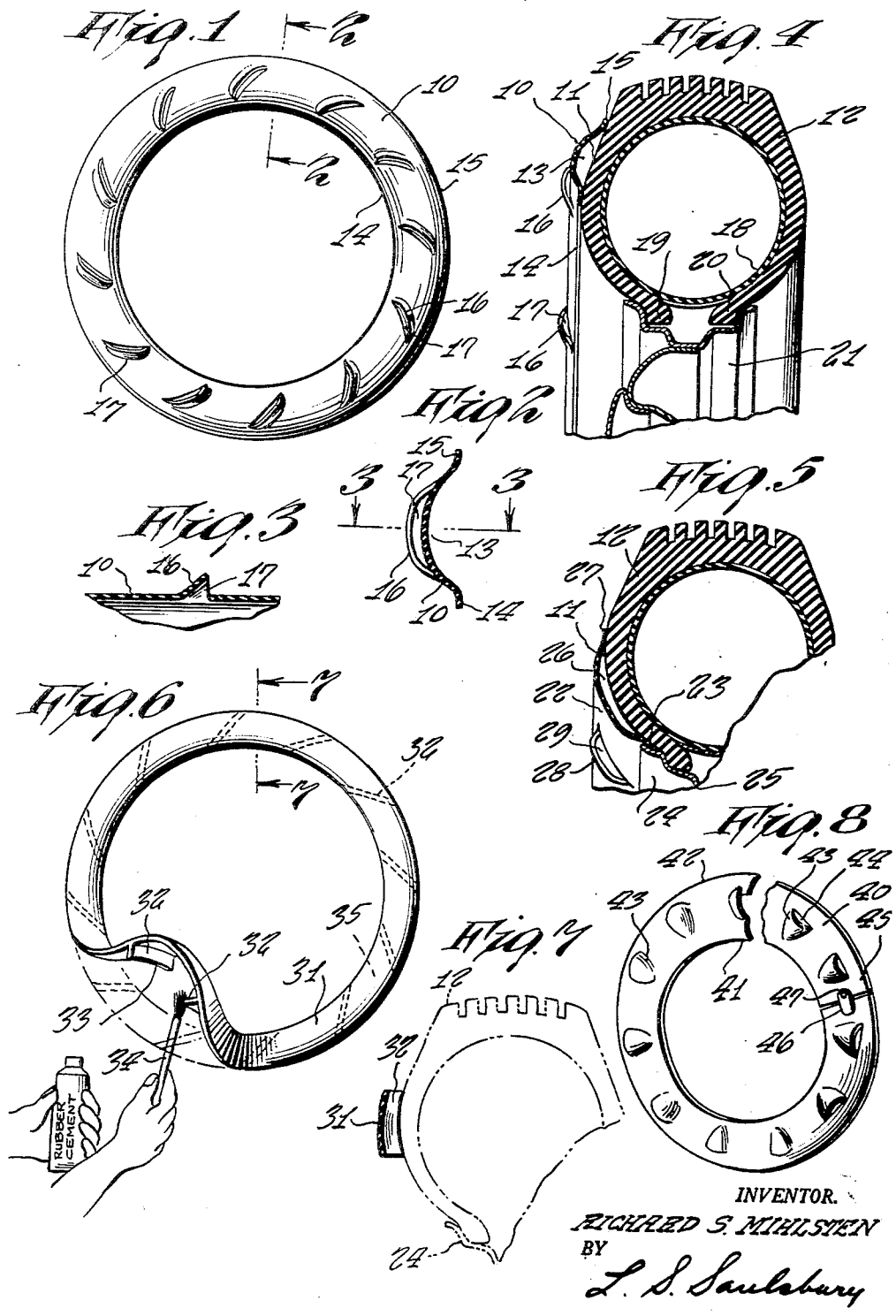

2,934,124
VEHICLE TIRE COOLING DEVICE

Richard S. Mihlsten, Brooklyn, N.Y.

Application June 4, 1953, Serial No. 359,589

14 Claims. (Cl. 152—153)

This invention relates to a vehicle tire cooling device.

It is an object of the present invention to provide a vehicle tire cooling device which can be attached to a vehicle tire in order to cause air to be picked up and delivered over the wall surface of the tire to effect a cooling action thereupon and to thereby keep the tire from becoming overheated and to prevent dangerous blowouts which are frequent when driving a vehicle at high speeds and during hot weather.

It is another object of the invention to provide a tire cooling device which is formed of rubber or plastic and which can be connected to the side wall surface of the vehicle tire by a simple cementing operation and which is so shaped and designed as to suck in air as the vehicle is moved forwardly and which will provide a continuous passage about the tire so that the air while taken in on the forward side of the tire will be delivered about the full extent of the tire and exhausted at the rear side.

It is another object of the invention to provide a vehicle cooling tire device which, when mounted upon the side face of the tire, will give to the tire a pleasing appearance and a white wall effect.

It is another object of the invention to provide a vehicle tire ventilating device adapted to be attached to the side surfaces of automobile tires which can be fixed to either side of the tire and be adapted to draw in the air as the tire and wheel of the vehicle are rotated and thereby to make unnecessary the need for left and right tire cooling device and to make possible the making of the device from one die.

Other objects of the invention are to provide a tire cooling device which is of simple construction, inexpensive to manufacture, has a minimum number of parts, easy to install upon the tire, formed as an attachment for the tire, fits tightly upon the tire surface and efficient in operation. For a better understanding of the invention, reference may be had to the following detailed description taken in connection with the accompanying drawing, in which:

Figure 1 is an elevational view of a tire cooling device constructed according to one form of the invention;

Fig. 2 is an enlarged transverse sectional view taken through the device as on line 2—2 of Fig. 1;

Fig. 3 is a fragmentary longitudinal sectional view taken on line 3—3 of Fig. 2;

Fig. 4 is a vertical sectional view of an automobile tire and rim and of the device attached to the side of the tire;

Fig. 5 is a vertical sectional view of an automobile tire and of a modified form of device wherein the device is attached to the tire by means of the tire rim;

Fig. 6 is an elevational view of a further form of the device with a portion of the same elevated and shown in perspective and with illustration made as to the manner in which cement is applied to the projections thereof for the securement of the device on the tire surface or wall;

Fig. 7 is a vertical sectional view of the device shown in Fig. 6 as viewed on line 7—7 thereof;

Fig. 8 is a perspective view of a still further form of the invention which is adapted to be placed on either side of the tire or on either wheel and wherein the ventilating openings extend radially.

Referring now particularly to Figs. 1, 2, 3 and 4, 10 represents a ring body of a size and diameter adapted to fit over a side wall surface 11 of a vehicle tire 12. This ring body is dished on its underside to provide an annular passage 13 for the flow of air over the surface of the tire. The body 10 has inner and outer peripheral flanges 14 and 15 by which the body 10 can be fixed to the tire surface 11 of the tire 12. This body is of rubber or plastic and can be secured rigidly to the tire by means of rubber cement or, if desired, by vulcanization.

In order that the air will be directed into the space 13, air gathering portions 16 are projected outwardly from the outer surface of the body 10 and provide openings 17. The outwardly projected portions 16 extend at a leading angle from a radial line so that as the tire moves forwardly, air will be swept into the passage 13 and over the surface 11 of the tire so as to cool the same. This air will flow around the tire and will exhaust as the air gathering portions 16 pass rearwardly with the tire. Accordingly, there will be a continuous flow of air over the tire surface 11 and the tire will be appreciably cooled.

The tire 12 has an inner tube 18 and its rim engaging portions 19 and 20 are mounted in rim 21 in the usual manner.

In Fig. 5, there is shown another form of the invention wherein a body 22 of ring shape is fitted upon the side of tire 12 and secured thereto by engagement of its inner periphery 23 with flange 24 of tire rim 25. This body is of ring shape and is dished on its inner side to provide passage 26 around the tire and over surface 11 of the tire wall. This body is preferably made of plastic but may be made of metal or hard rubber. Its outer peripheral flange 27 may be cemented or vulcanized upon the tire wall surface 11. This ring in order that it can be fitted upon the rim 24 is split in the manner as shown in Fig. 8, and a projection is used to clamp the split ends together in a manner to be described more in detail in connection with Fig. 8.

The ring body 22 has outwardly struck portions 28 to provide openings 29. These portions 28 are struck outwardly in a manner as shown in Fig. 1, for the portion 16.

In Figs. 6 and 7, there is shown a still further form of the invention, wherein there is provided an annular ring or disk 31 of flat flexible and pliable sheet material on which are provided angularly extended attaching projections 32 having smooth internal surfaces 33 adapted to be coated with rubber cement in the manner illustrated in Fig. 6 with a brush 34 and secured to the wall surface of the tire. These projections 32 are circumferentially spaced from one another and preferably inwardly flared in order to provide a large surface 33 and extend at an angle from a radial line to gather and scoop air as the same turns with the tire and to direct this air through spaces 35 provided between the projections 32. The body of the ring 31 will lie outwardly of the tire surface and accordingly the air will be directed over the tire surface and under the body of the ring to the spaces 35.

In Fig. 8 there is shown a form of the invention wherein the ring is adapted for attachment to either side of the wheel or tire. This form of the invention is formed similar to the form of the invention shown in Fig. 5 except that the projections are on radial lines and the openings extend to such radial lines. A body 40 of annular shape has an inner peripheral flange 41 adapted to fit under the rim 24 in the manner shown in Fig. 5 for the body 22. The outer peripheral flange, as indicated at 42, will be cemented to the side wall of the tire. However, the flange 41 is sufficient to hold the ring 40 in place if it is made of rigid material.

Projections 43 extend radially outwardly and these projections have openings 44 which will collect the air as the wheel moves forward so that the opening tends to incline downwardly and rearwardly and upon the downward sweep of the tire.

The ring 40 is split as indicated at 45 in order to permit the easy insertion of the ring over the flange 24 of the rim 25. Thereafter, a clamp plate 46 on one of the split ends will be fixed to the other split end by a fastening screw 47. This will hold the body 40 tightly around the rim and prevent its outward displacement therefrom. This ring 40 can be made of plastic, rubber or metal and can be cemented or otherwise secured by its outer periphery to the wall surface. An internal passage is provided for the air so that it will pass over the surface of the tire wall and effect a cooling action.

It should now be apparent that there has been provided an effective cooling device for vehicle tires. It will also be apparent that the device can be easily applied to the tire and made or molded as a part thereof and that it will have a pleasing effect on the tire. It will make it look like the traditional white wall that is used often on tires.

While various changes may be made in the detail construction, it shall be understood that such changes shall be within the spirit and scope of the present invention, as defined by the appended claims.

What is claimed is:

1. A vehicle tire comprising a tire tread, annular side walls depending from the tread, an annular wall body coaxial with and laterally overlying in spaced relation a substantial annular area of at least one side wall for enforced heat-abstracting air flow in the space therebetween, said annular wall body being unitarily connected to said side wall in said coaxial and laterally overlying spaced relation, there being in said annular wall body a plurality of substantially uniformly annularly spaced apart substantially similar openings that face in substantially the same direction relative to the axis of the tire with their respective planes extending in a direction away from the tire side wall and each making a substantial angle to the general plane of said annular wall body to act, in response to speed of forward travel of the tire, successively as forced-air intakes and suction air-outlets according as accompanying tire rotation reverses their respective directions of facing relative to the forward direction of travel of the tire.

2. Tire cooling means for vehicle tires, which means comprises an annular ring body having radially spaced apart outer and inner peripheries whose radii are appreciably shorter than that of the road-contacting tread surface of a tire to which it is to be applied, and adapted adjacent said peripheries to engage with a side wall surface of the tire, said ring body being dished annularly convexly outwardly with respect to the position of said side wall of the tire to provide an annular hollow between the tire wall and the concave surface of the ring body, the latter having a series of openings annularly spaced apart from one another and running through the ring body thereby to gather air from outside said body into the hollow as the tire is rotated.

3. Tire cooling means for vehicle tires, which means comprises an annular ring body having radially spaced apart outer and inner peripheries whose radii are appreciably shorter than that of the road-contacting tread surface of a tire to which it is to be applied, and adapted adjacent said peripheries to engage with a side wall surface of the tire, said ring body being dished annularly convexly outwardly with respect to the position of said side wall of the tire to provide an annular hollow between the tire wall and the concave surface of the ring body, the latter having a series of projections extending outwardly from the ring body and annularly spaced apart from one another and in each of them an opening running through the ring body thereby to gather air from its outside into the hollow as the tire is rotated.

4. Tire cooling means as claimed in claim 3, wherein the projections on the ring body extend along radial lines and each has its opening positioned normal to its respective radial line.

5. Tire cooling means as claimed in claim 2, wherein the ring body is split transversely from one periphery to the other thereby providing split ends, and means for securing together the split ends of the ring body to prevent their further separation during the running of the tire.

6. Tire cooling means as claimed in claim 2, wherein the radius of the inner periphery of the ring body is short enough for the edge of the latter adjoining the inner periphery to be tightly engaged between the flange of a tire rim and the portion of the wall of the tire adjacent its bead.

7. Tire cooling means as claimed in claim 6, wherein the ring body is split transversely from one periphery to the other thereby providing split ends, and means for securing together the split ends of the ring body to prevent their further separation during the running of the tire.

8. Tire cooling means for vehicle tires, as claimed in claim 2, wherein the annular ring has radially inner and outer peripheral flanges adapted to engage with the side wall surface of the tire.

9. A vehicle tire comprising side walls and a peripheral road-contacting tread, and an annular ring body having radially spaced apart inner and outer peripheries and sidewardly spaced outwardly away from the outer surface of at least one of said side walls, one of said peripheries being integrally connected to one side wall of the tire, said ring body having projections annularly spaced apart from one another and with openings therein adapted to collect air and direct it between said ring body and the outer surface of said side wall as the wheel is rotated, to cool the tire.

10. The tire cooling means as claimed in claim 3, wherein the opening in each projection is at the same end of it as is such opening in each of the other projections, and when said opening is positioned directly above the axis about which the ring body would rotate in use, said opening inclines upwardly in a direction away from the closed end of its projection and at an acute angle to the radius passing through the radially inner end of said opening.

11. A vehicle tire cooling device comprising an annular ring relatively flat in the direction extending radially outwardly from its axis and with the radius of its outer periphery appreciably shorter than that of the road-contacting tread surface of a tire to which it is to be secured, and having an annular series of similar relatively short, transverse projections extending outwardly from one of its flat faces and with the outermost face of each of the projections adapted to be secured by a cementing operation to the outer surface of a side wall of a vehicle tire, each of said projections being similarly inclined to its respective proximate radial line at an acute angle from its inner end to its outer end whereby the latter is directed toward the normal direction of rotation of the tire, said projections, after said device is secured correctly to the outer surface of a side wall of a tire, thereby providing between each successive two of them a zone in which air can be scooped up from outside said device and directed in a stream through said zone over the outer surface of the wall of the tire to cool it.

12. A vehicle tire cooling device, which comprises an annular ring body, the radius of whose outer periphery is appreciably shorter than that of the road-contacting tread surface of a tire to which said device is to be attached, means on one surface of said ring body for attaching it to the outer surface of a side wall of a tire to provide, between said tire surface and said one surface of the ring body to face said tire surface, passages for the flow of air substantially radially inwardly from outside the outer periphery of the ring body and over said outer surface of the side wall of the tire, and projections on said ring body providing openings communicating with said passages and adapted to scoop up air from outside of said ring body and to cause it to flow into and through said passages as the ring body rotates as a unit with the tire, thereby to cool the tire.

13. A vehicle tire comprising a tire tread, an annular side wall depending from each side thereof, an annular ring body having radially spaced apart outer and inner peripheries whose radii are appreciably shorter than that of the road-contacting tread surface of the tire, said ring body being attached to the outer surface of at least one of said side walls and at annularly spaced apart locations and with each such attachment extending from about the inner periphery to about the outer periphery of said ring body and being similarly inclined to its respectively proximate radius, and said body being spaced away from said outer surface between each two successive such attachments and thereby providing an annular series of open-ended separate zones with each of them extending relatively annularly along its respective portion of said side wall and having its opposite ends, one at each of the peripheries of said ring, communicating with the outer air whereby during the rotation of the tire, in the direction toward the upward inclination of such zones, to draw air from the outside of said ring body to flow relatively annularly over the portion of the surface of the tire wall exposed in said zone and thereby to cool it.

14. A vehicle tire cooling device to be affixed to the outer surface of a side wall of a tire having a tread and an annular side wall depending from each side thereof, which device comprises an annular ring body which is from substantially flat to slightly dished in the direction extending radially outwardly from its center point and with the radius of its outer periphery being appreciably shorter than that of the road-contacting surface of such tire; means on said ring body whereby to affix it to the outer surface of a side wall of the tire, with the concavity of any dished form in said ring body facing said outer surface of the side wall of the tire, and with at least the major part of the surface of said ring body facing the outer surface of said side wall being spaced away therefrom thereby to provide at least one cooling zone between said two surfaces, through which zone air can pass as referred to hereinafter; annularly substantially equidistantly spaced apart from one another projections extending transversely from said ring body within the bounds of its radially inner and outer peripheries, and openings associated with said projections providing communication between the air exterior to said ring body when affixed to the tire and the said at least one cooling zone between them, whereby air from outside said ring is scooped up and caused to flow into and through and then out of said at least one cooling zone as the ring body rotates as a unit with the tire in its normal running rotation, and thereby cools the tire.

References Cited in the file of this patent

UNITED STATES PATENTS

| Re. 19,467 | Lyon | Feb. 12, 1935 |
| 917,734 | Kempshall | Apr. 6, 1909 |
| 1,176,158 | Markle | Mar. 21, 1916 |
| 1,665,437 | Booth | Apr. 10, 1928 |
| 2,018,189 | Prince | Oct. 22, 1935 |
| 2,311,999 | Purvis | Feb. 23, 1943 |
| 2,383,662 | McClaskey | Aug. 28, 1945 |
| 2,682,937 | Lyon | July 6, 1954 |